(12) United States Patent
Paulsen et al.

(10) Patent No.: US 7,493,532 B2
(45) Date of Patent: Feb. 17, 2009

(54) METHODS AND STRUCTURE FOR OPTIMIZING SAS DOMAIN LINK QUALITY AND PERFORMANCE

(75) Inventors: Erik Paulsen, Colorado Springs, CO (US); Joshua P. Sinykin, Colorado Springs, CO (US); Gabriel Romero, Colorado Springs, CO (US)

(73) Assignee: LSI Corporation, Milpitas, CA (US)

( * ) Notice: Subject to any disclaimer, the term of this patent is extended or adjusted under 35 U.S.C. 154(b) by 538 days.

(21) Appl. No.: 11/251,393

(22) Filed: Oct. 14, 2005

(65) Prior Publication Data

US 2007/0087615 A1  Apr. 19, 2007

(51) Int. Cl.
*G01R 31/28* (2006.01)
(52) U.S. Cl. .................................... 714/715
(58) Field of Classification Search ................ 714/715, 714/744
See application file for complete search history.

(56) References Cited

U.S. PATENT DOCUMENTS 5,418,939 A * 5/1995 Fredericks et al. ............ 714/47
5,831,545 A * 11/1998 Murray et al. ............. 340/7.27
6,643,815 B1 * 11/2003 Davis et al. ................. 714/758
2004/0268190 A1 * 12/2004 Kossel et al. ................ 714/704
2007/0061681 A1 * 3/2007 Carmichael ................. 714/760

* cited by examiner

*Primary Examiner*—James C Kerveros
(74) *Attorney, Agent, or Firm*—Duft, Borsen & Fishman, LLP (57) ABSTRACT

Methods and structures within a SAS domain for automated tuning performance of a coupled pair of transceivers. In one aspect hereof, control registers of a transmitting transceiver coupled to a receiving transceiver are adjusted to a plurality of distinct combinations of settings. For each distinct setting, a test pattern may be transmitted from the transmitting transceiver to the receiving transceiver. Status registers of the transmitting transceiver and of the receiving transceiver may be read to identify errors in the transmission. Identified errors are counted for each for distinct setting of the control registers to determine a preferred setting to best tune operation of the transceiver pair. The testing may be performed by any SAS initiator device or SAS expander acting as an initiator and may be performed on any coupled pair of transceiver in the SAS domain.

14 Claims, 6 Drawing Sheets

METHODS AND STRUCTURE FOR OPTIMIZING SAS DOMAIN LINK QUALITY AND PERFORMANCE

BACKGROUND OF THE INVENTION

1. Field of the Invention

The invention relates generally to serial attached SCSI ("SAS") domains and more specifically to methods and structures fortuning transceiver circuits of devices in a SAS domain to optimize link quality and performance.

2. Discussion of Related Art

Small Computer Systems Interface ("SCSI") is a set of American National Standards Institute ("ANSI") standard electronic interface specification that allow, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website www.t10.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

In general, SAS devices (initiators, targets and expanders) use transceiver circuits for transmitting and receiving data by modulating signals applied to the SAS communication media. SAS devices are typically configured for nominal cabling and environmental conditions. Where particular applications do not comply with those nominal standards the transceivers may exchange data less than optimally. For example, where cabling or connectors are of poor quality or extend longer than anticipated for the nominal settings of a SAS device, the SAS exchanges may experience excessive errors and therefore require excessive re-transmissions and other forms of error recovery. Or, for example, where a SAS fabric is implemented as a backplane bus structure, the S21 and S11 signals may have different parameters across varying frequencies. However, present SAS device transceivers are not adapted to re-configure or tune to optimize for these and other environmental variations.

It is therefore evident from the above discussion that a need exists for improved solutions in a SAS domain to test and tune operation of transceivers for optimizing performance in a particular application.

SUMMARY OF THE INVENTION

The present invention solves the above and other problems, thereby advancing the state of the useful arts, by providing methods and structures associated with a SAS domain to automate testing and tuning of transceiver operation in SAS devices and expanders of the SAS domain. SAS related protocols permit reading and writing of various memory mapped registers of the transceivers of one SAS device from another SAS device in the domain. Features and aspects hereof provide for a first device in the domain to generate predetermined test patterns of modulated data on a transmitter/receiver pair of a path of the SAS domain and to read and write registers of the receiving end of the exchange to determine and optimize performance of the transceivers in that communication path. The process may be repeated for each communication path in the SAS domain to fully optimize each transceiver in the SAS domain.

A first feature hereof provides a method for tuning setting of transceivers in SAS components in a SAS domain. The method includes transmitting a predetermined test pattern of data through a transmitting transceiver to a receiving transceiver over a SAS communication path coupling the transmitting and receiving transceivers. The method also includes tuning operation of a transceiver in response to the transmission of the test pattern.

Another feature hereof provides a method for tuning performance of a coupled pair of transceivers, the pair comprising a transmitting transceiver and a receiving transceiver. The method includes clearing status registers of at least one of the pair of transceivers and setting control registers of the transmitting transceiver to adjust parameters of the transmitting transceiver operation. The method also includes transmitting a predetermined test pattern from the transmitting transceiver to the receiving transceiver and reading the status registers of at least one of the pair of transceivers to identify errors from the transmission. The method further includes incrementing an identified counter of a plurality of counters for any identified errors from the transmission wherein the counter is associated with the current settings of the control registers and repeating the steps of clearing, setting, transmitting, reading, and incrementing for a plurality of distinct settings of the control registers. The method also includes determining a preferred setting of the control registers based on the plurality of counters.

Another feature hereof provides a system including a first transceiver having first configuration registers for storing current configuration values to configure operation thereof and having first status registers to identify errors detected by the first transceiver. The system also includes a second transceiver communicatively coupled to the first transceiver having second configuration registers for storing current configuration values to configure operation thereof and having second status registers to identify errors detected by the second transceiver. The system also includes a SAS initiator device communicatively coupled to the first transceiver and communicatively coupled to the second transceiver. The SAS initiator device further comprises a first error table comprising a first plurality of counters associated with the first transceiver and a second error table comprising a second plurality of counters associated with the second transceiver. The SAS initiator device also includes a link tester adapted for configuring the first and second transceivers to transmit a test patter therebetween and adapted for reading the first and second status registers and adapted for counting, in the first error table, errors detected in the read first status registers and adapted for counting, in the second error table, errors detected in the read second status registers. The SAS initiator also includes a transceiver tuner for tuning settings of the first and second configuration registers based on the first error table and based on the second error table.

DETAILED DESCRIPTION OF THE DRAWINGS

Figure 1:
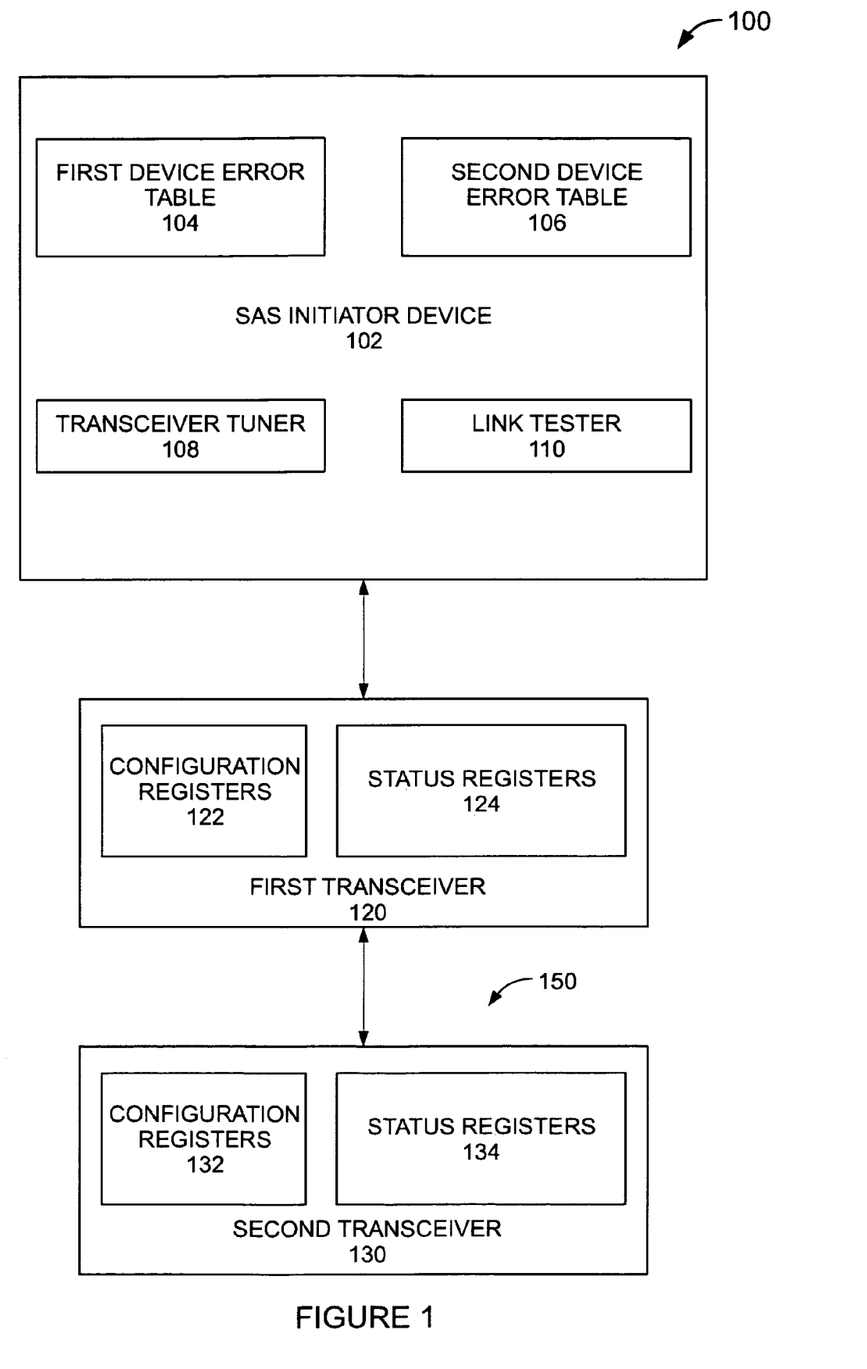
FIG. 1 is a block diagram of a SAS domain embodying features and aspects hereof for automated tuning of transceiver performance.

FIG. 1 is a block diagram showing a SAS domain 100 including features and aspects hereof to provide automated tuning of transceiver operational parameters in SAS devices of the SAS domain 100. SAS domain 100 may include a coupled pair of transceivers including first transceiver 120 coupled to second transceiver 130. As is generally known in the art, a typical transceiver component includes configuration registers for configuring operation of the transceiver and status registers for reading status and error information regarding ongoing operation of the transceiver. First transceiver 120 may therefore include configuration registers 122 and status registers 124. Second transceiver 130 may include configuration registers 132 and status registers 134. First transceiver 120 is coupled to second transceiver 130 via communication path 150.

SAS initiator device 102 (or any SAS device in SAS domain 100) may include features and aspects hereof to automatically test and tune operation link 150 by configuring first transceiver 120 and/or second transceiver 130. In particular, link tester 110 within SAS initiator device 102 may set parameter values in configuration registers 122 of first transceiver 120 and/or in configuration registers 132 of second transceiver 130 to permit testing of the operation of the transceivers exchanging information therebetween over the path between them. Responsive to the results of such a test configuration, transceiver tuner 108 may determine a preferred set of configuration parameters to most effectively utilize communication path 150. More specifically, link tester 110 may configure the first transceiver 120 as a transmitting transceiver and second transceiver 130 as a receiving transceiver. The transceiver pair is then programmed with a variety of different configuration parameter values in configuration registers 122 and 132. Each variant of these programmable operating parameters may alter transmitting and/or receiving characteristics of the transceiver pair as presently coupled together.

For each variant of the possible configuration parameter values programmed in the respective configuration registers, link tester 110 may direct test pattern data to be transmitted over communication path 150 between first transceiver 120 and second transceiver 130. The test pattern data may be selected to stress a particular operating parameter of the coupled pair of transceivers 120 and 130.

Link tester 110 may also read status registers 124 and 134 of first transceiver 120 and second transceiver 130, respectively. Reading the status registers during, or following completion of, the test pattern transmission for each variant of the programmed configuration parameters allows a link tester 110 to detect sensed error conditions during the test pattern transmission for each programmed set of configuration values.

SAS initiator device 102 may also include a first device error table 104 and a second device error table 106. Each error table may comprise one or more counter devices or counter variables used for counting the number of error conditions for a corresponding transceiver in a corresponding setting of the configurable parameter values. Each time link tester 110 configures a particular variant of the possible configuration parameter values, it may increment the counter for each error condition detected during transmission of a corresponding test pattern. Error conditions associated with first transceiver 120 sensed in status registers 124 may be counted in first device error table 104 while errors sensed in operation of the second transceiver 130 by reading status registers 134 may be counted in second device error table 106.

Following completion of transmission of various test sequences and test patterns each in conjunction with an associated configuration of the operating parameters of the transceiver pair, transceiver tuner 108 may analyze the information in first device error table 104 and/or second device error table 106 to identify a preferred set of configuration parameter values that may reduce the likelihood for transmission errors in a particular operating environment of SAS domain 100. Transceiver tuner 108 may then program the identified configuration parameter values into the configuration registers 122 and 132 of first transceiver 120 and second transceiver 130, respectively, to continue or commence normal operation with preferred configuration parameter values. Thus, SAS initiator device 102 may tune transceiver pair 120 and 130 coupled by communication path 150 for improved operation thereof.

In accordance with other features and aspects hereof discussed in further detail herein below, SAS initiator device 102 may iterate using recursive descent or other iterative algorithms to test and optimize operation of each coupled pair of transceivers in a SAS domain. A large SAS domain is often hierarchically organized and may include any number of SAS initiator devices, SAS target devices, SAS expanders, etc each of which may include one or more transceivers.

In accordance with features and aspects hereof, error table 104 and error table 106 may be implemented as N-dimensional arrays of counter devices or counter variables stored in a memory where N is the number of configuration parameter values that may be programmed in the configuration registers of a particular transceiver pair to be tested and tuned. The size of the N-dimensional array in each dimension may be determined in accordance with the number of discrete values that may be programmed for the particular, corresponding configuration parameter value.

By way of example, the Gigablaze® high speed serial transceiver components available from LSI Logic Corporation (see, e.g., www.lsil.com) permit programming of at least three distinct parameter values: namely, drive strength, drive emphasis, and slew rise/fall parameter values may be programmed to minimize or reduce error rates in transmissions between a transmitting transceiver and a receiving transceiver. Those of ordinary skill in the art will readily recognize similar programmable features in other transceiver circuits. Thus, the LSI Logic Gigablaze® transceiver is intended merely as exemplary of one common transceiver device that includes such programmable configuration parameter values.

In the example discussed above utilizing Gigablaze® transceivers, the error tables 104 and 106 of FIG. 1 may be of dimension N=three. The drive emphasis dimension may include integral values ranging from 0 through 7 (i.e., eight discrete values). The drive strength dimension may include integral values ranging from 15 to 0 (i.e., 16 discrete values). The slew rise/fall parameter value may include integral values ranging between 0 and 7 (i.e., eight discrete values). Thus, exemplary error tables 104 and 106 may include 1024 (8×16× 8) counters that may be incremented when test pattern transmission and/or reception errors are detected. The counter to be incremented is that which is addressed by the 3-dimensional indices corresponding to the programmed parameter values.

SAS initiator device 102 of FIG. 1 is shown with two error table structures (104 and 106). Those of ordinary skill in the art will readily recognize that similar testing and error tracking and analysis may be performed utilizing a single error counter table or any number of error counter tables storing error counts for each of multiple transceivers in the SAS domain. The SAS initiator device 102 of FIG. 1 therefore merely represents one exemplary embodiment of features and aspects hereof to test a coupled pair of transceivers under a variety of configuration parameter value settings and counting the frequency of errors for each of the variants of the parameter value settings.

Figure 1A:
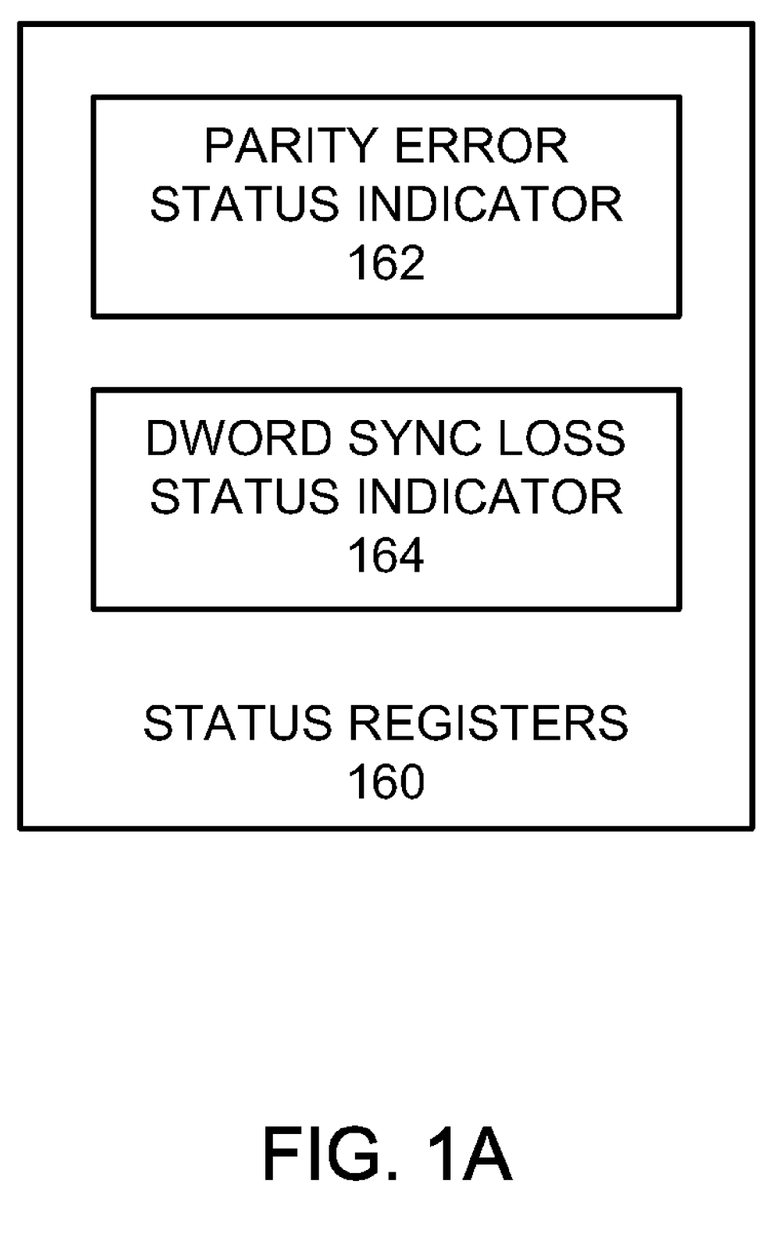
FIG. 1A is a block diagram of exemplary status registers in accordance with features and aspects hereof.

Still further, those of ordinary skill in the art will recognize a variety of additional elements useful in conjunction with a fully operational SAS initiator device or transceiver devices associated with a SAS domain communication path. Such additional elements are well known to those of ordinary skill in the art and have been eliminated from FIG. 1 for the sake of brevity of this description. For example, FIG. 1A is a block diagram of exemplary status registers 160 in accordance with features and aspects hereof. The status registers 160 include a parity error status indicator 162 and a dword sync loss status indicator 164. It will be understood by those of ordinary skill in the art that "dword synchronization" means detection of an incoming stream of dwords from a physical link by a PHY. In addition, the particular decomposition of separate functional elements within SAS initiator device 102 or within the first or second transceivers 120 and 130 is intended merely as exemplary for purposes of this simplified description. Those of ordinary skill in the art will readily recognize that the various components and functional elements may be integrated or separated in a variety of equivalent matters and that additional or fewer functional elements may be so defined. Such matters of design choice are well known to those of ordinary skill in the art.

Figure 2:
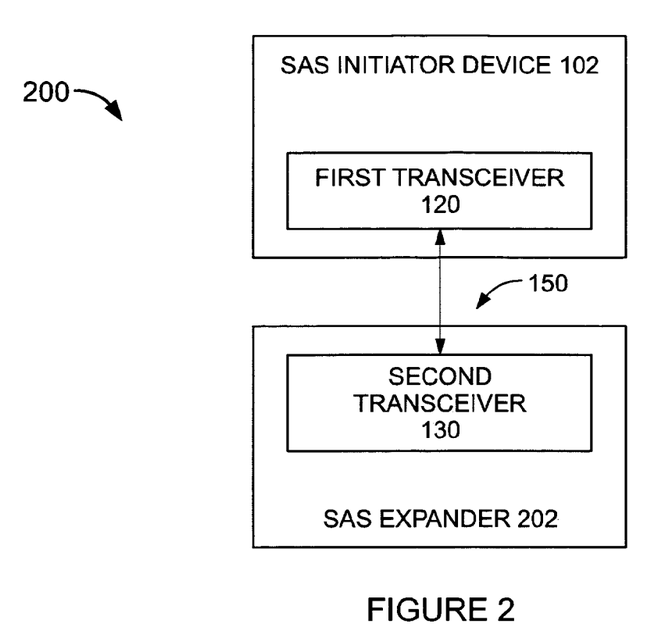
FIG. 2 is a block diagram of an exemplary embodiment of features and aspects hereof wherein a coupled transceiver pair to be tuned resides in a SAS initiator and a neighbor SAS expander.
Figure 3:
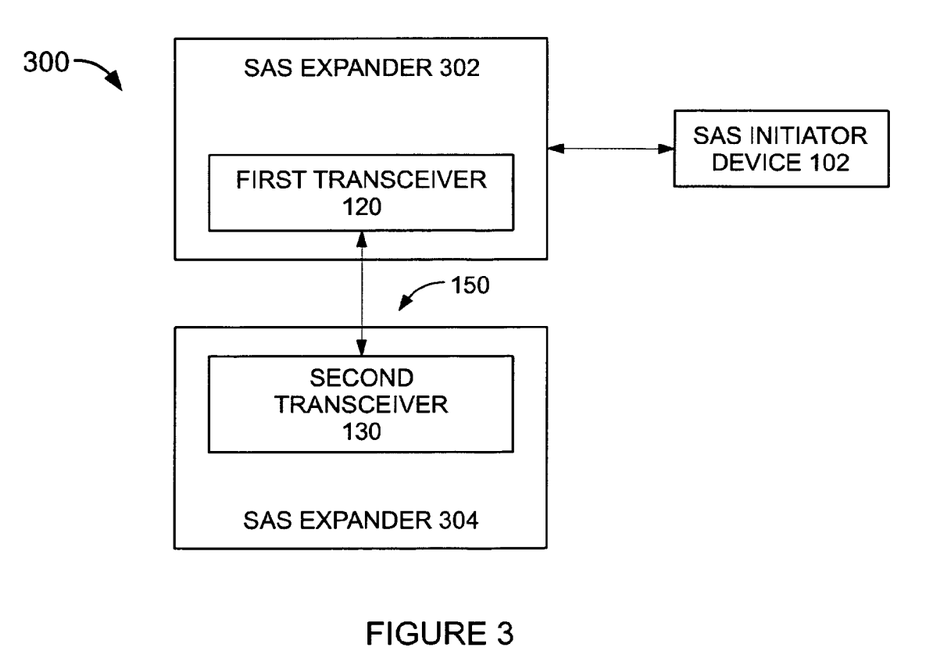
FIG. 3 is a block diagram of an exemplary embodiment of features and aspects hereof wherein a coupled transceiver pair to be tuned resides in neighboring SAS expanders.

FIG. 2 shows a system 200 in accordance with features and aspects hereof wherein a SAS initiator device 102 integrates the first transceiver component 120 therein. In other words, the first transceiver 120 used in testing and reconfiguring coupled pared transceivers 120 and 130 may be integrated within the SAS initiator device 102 that performs the testing and tuning operations. Second transceiver 130 may be, for example, integrated within a SAS expander 202 or other SAS devices such as a SAS target device. By contrast, FIG. 3 shows yet another aspect hereof in which the SAS initiator device 102 performs the testing and tuning functions in accordance with features and aspects hereof but the coupled pair of transceivers 120 and 130 are each integrated within distinct SAS expanders 302 and 304, respectively, hierarchically arranged within the SAS domain of system 300.

More generally, those of ordinary skill in the art will readily recognize that any SAS device within a SAS domain may be suitably designed or programmed to perform the testing and tuning features hereof and may do so for any suitably designed or programmed transceiver pair configured or positioned anywhere within the hierarchy of a SAS domain. In particular, SAS SMP protocol exchanges may be used for programming the configuration registers and for reading error and status registers to evaluate performance of the coupled pair of transceivers anywhere in the SAS domain. Those of ordinary skill in the art will therefore readily recognize a variety of equivalent embodiments wherein the testing and tuning features may be integrated within any SAS device of virtually any SAS domain configuration and topology. By forwarding SMP protocol exchanges to configure transceiver parameters and to evaluate response of the coupled pair of transceivers to test patterns, any coupled pair of transceivers located anywhere within the SAS domain may be so tested and tuned by any SAS device in the domain acting in the role of a SAS initiator.

Figure 4:
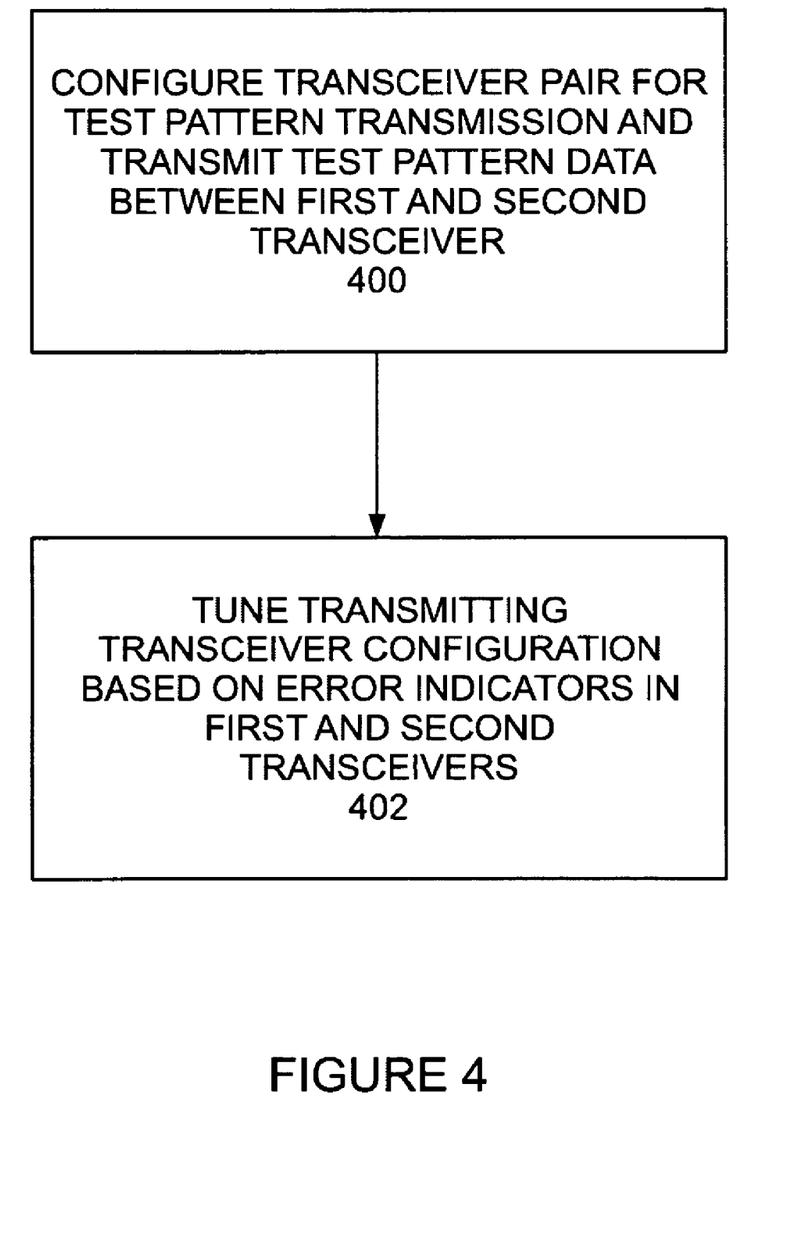
FIG. 4 is a flowchart describing an exemplary method in accordance with features and aspects hereof to automate tuning of a coupled pair of SAS transceivers.

FIG. 4 is a flowchart broadly describing a method in accordance with features and aspects hereof in which a device in the SAS domain tests and tunes operation of a coupled pair of transceivers within the SAS domain. Element 400 is first operable to configure a pair of transceivers from test data exchange and to transmit test pattern data between the first and second transceivers of the coupled pair. Element 402 then evaluates performance of the coupled transceiver pair for improved operation of the coupled transceiver pair. Performance of the transceiver pair may be determined by counting various error conditions indicated by error indicia within the first and second transceivers while transmitting the test pattern data. Element 400 may be operable repetitively to reconfigure parameters of the transceiver pair to thereby converge on a preferred setting of the operational parameters.

Figures 5, 5A:
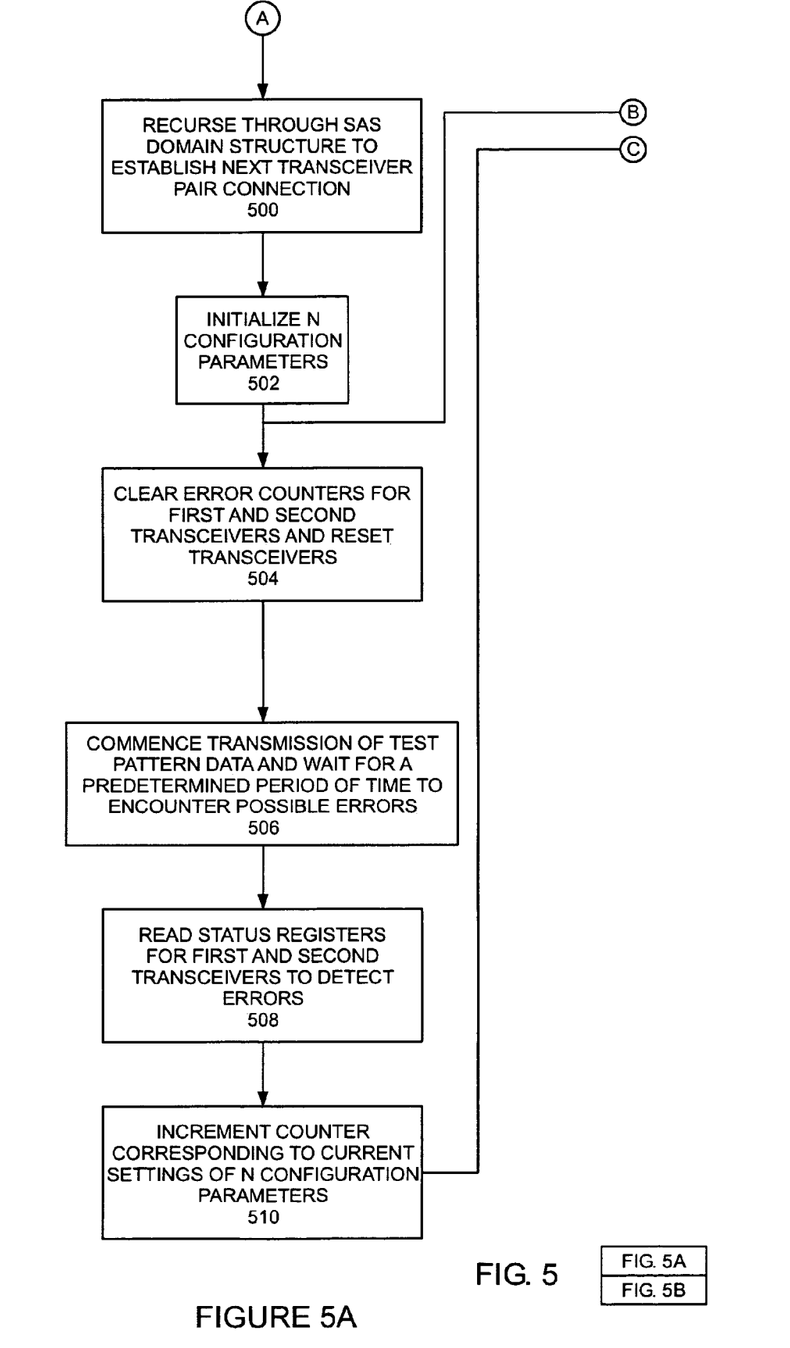
FIGS. 5A and 5B are a flowchart describing an exemplary method in accordance with features and aspects hereof for tuning all coupled pairs in a SAS domain.
Figures 5, 5B:
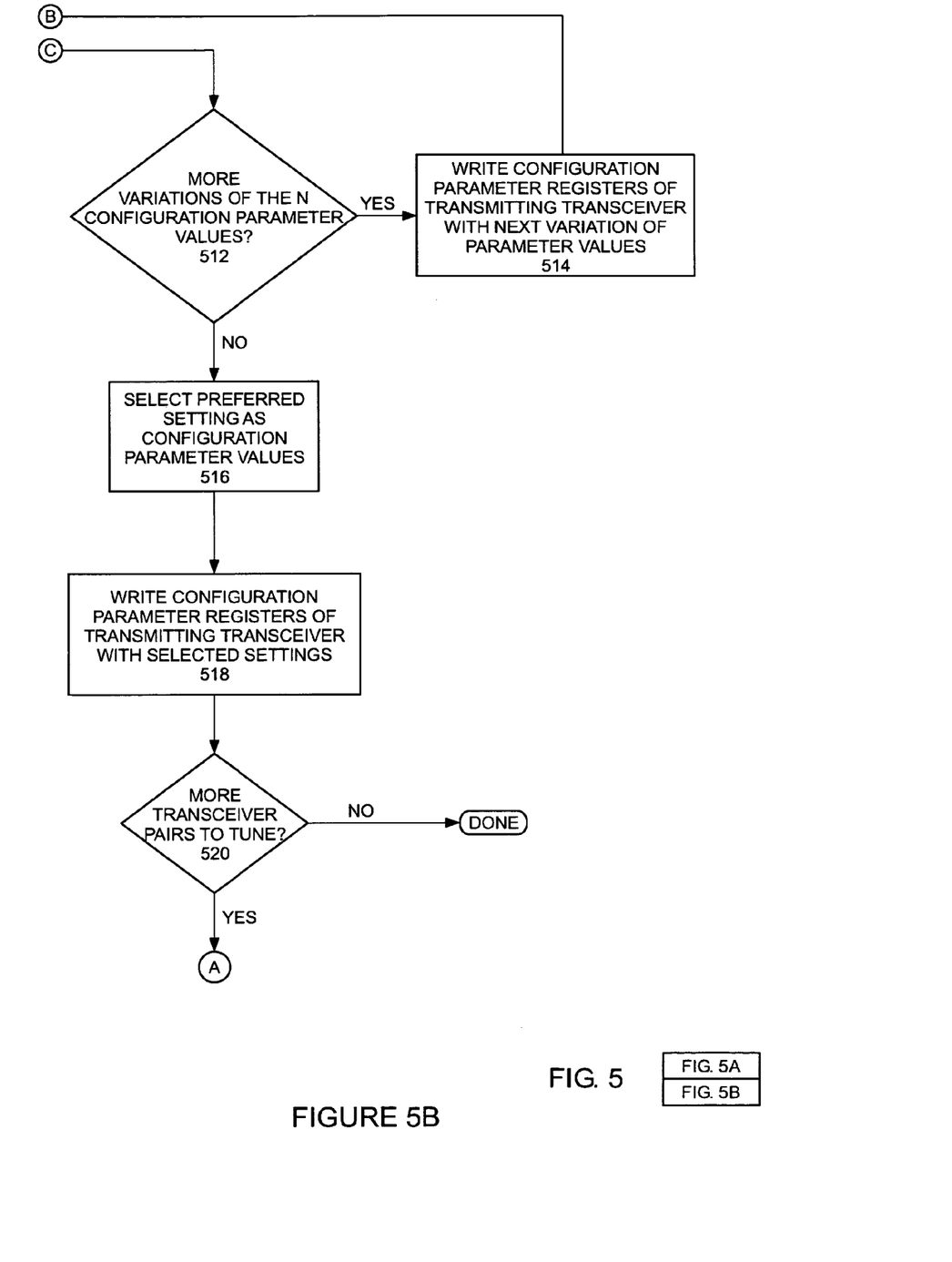

FIGS. 5A and 5B are a flowchart providing additional details of a method operable in accordance with features and aspects hereof to test and tune coupled pairs of transceivers within a SAS domain. The method of FIGS. 5A and 5B preferably repeats for each transceiver pair to be tested and tuned within a SAS domain. Elements 500 through 520 are therefore repetitively performed by recursing or otherwise walking through the SAS domain structure to establish a connection between each coupled pair of transceivers and to test and tune each identified coupled pair. Element 500 is therefore operable to traverse the topology of the SAS domain structure to identify a next coupled transceiver pair to be tested and tuned. Having so identified such a next transceiver pair, appropriate SAS protocol exchanges are initiated to establish a logical connection between the coupled transceiver pair so that test data and associated SMP protocol configuration commands and status requests may be exchanged.

Having so identified a next transceiver pair and having established a logical connection therebetween, element 502 is then operable to transmit appropriate SMP protocol commands to write the configuration parameter values for a transmitting transceiver of the current pair. The configuration parameter values may be written to configuration registers associated with the first transceiver of the transceiver pair to be tested. The number of transceiver configuration parameter values to be so written may vary in accordance with the needs of a particular transceiver in a particular application. In one exemplary application as noted above, the LSI Gigablaze® family of transceivers may include configurable parameter values for drive the emphasis, drive strength, and slew rise/fall. Thus the number of configurable parameter values "N" may be any value appropriate to the particular transceiver being configured as a transmitter.

Element 504 next resets or clears error status registers for the first and second transceivers of the coupled pair presently being tested and clears error counters used to count errors encountered while testing a particular configuration of the pair. As noted above, such an error counter table may be configured as an N-dimensional array where each dimension has a number of entries corresponding to the number of discrete values that may be programmed for the corresponding programmable parameter value. Element 506 next commences transmission of an appropriate test pattern to evaluate performance of the coupled pair of transceivers as presently programmed by current parameter values. Element 506 is also operable to await an appropriate predetermined period of time following commencement of the transmission to allow a plurality of such test pattern transmissions to be completed and thus a larger sample was for determining the quality of operation of the coupled pair of transceivers.

Element 508 then reads the status registers of the first and second transceivers of the coupled pair to detect errors in the test pattern transmissions. The error status registers within the transceiver may themselves comprise counters of the number of errors sensed and/or retires attempted or may simply be status indicators that one or more errors occurred. In the latter case, those of ordinary skill in the art will readily recognize that elements 506 and 508 may be iteratively operable to transmit test patterns and periodically poll the error and status registers of the paired transceivers to detect errors as transmissions progress. In either case, element 510 is generally operable to increment a counter device or variable corresponding to the current settings of the N configurable parameters. The increment may be as noted above an increment indicative of a single detected error or of multiple detected errors depending upon the particular information stored by the transceiver in its error and status registers as read by the SAS initiator performing the test and tune operations. Thus, elements 506 a through 510 are operable to transmit a plurality of test pattern sequences in a current configuration of the transmitting transceiver and to count the number of errors in the test pattern exchanges generated in that particular configuration of the transmitting transceiver.

Element 512 then determines whether additional variations of the N parameter values need be configured and utilized. If so, element 514 is operable to write new parameter values in configuration registers of the transmitting transceiver. Processing then continues looping back to element 504 to begin counting errors arising during transmissions of test patterns in accordance with the newly programmed configuration parameters. Thus, elements 504 through 514 are iteratively operable to attempt test pattern transmissions for each of the possible combinations of parameter values for the N configuration parameters.

Eventually, when all combinations of the N parameters have been tested for the present transceiver pair, element 516 is operable to determine from the counter values which parameter setting for this transceiver pair is preferred. The preferred parameter setting will be that which produces the lower error count relative to other parameter settings. Where numerous settings produce similar or identical error counts, any of the settings may be selected or a preferred setting may be selected in accordance with other criteria or heuristics well known to those of ordinary skill in the art such as immunity to other conditions untested or untestable. Element 518 then writes the configuration registers of the transmitting transceiver of the pair to set the selected preferred configuration parameter values for further operation of this transceiver pair.

Element 520 then determines whether additional transceiver pairs in the SAS domain remain to be tested and tuned by operation of the method. If so, processing continues at element 500 (label A) to repeat the processing of the method for a next transceiver pair of the SAS domain.

The method of FIGS. 5A and 5B therefore establishes a connection with each pair of coupled transceivers in the SAS domain, performs testing of the transmissions between the pair of transceivers using all possible configurable parameter settings, and selects the preferred setting based on the count of errors detected during the test pattern transmissions.

As noted above, the method may maintain an error count table for one transceiver of the pair or for both transceivers. Further, the determination of a preferred, selected set of parameter values may be determined in accordance with the error counts of either or both of the error count tables.

Features and aspects hereof may also be understood by those of ordinary skill in the art with reference to a pseudo-code example that follows. The pseudo-code example provides a method in accordance with features and aspects hereof to test and tune operation of each coupled pair of transceivers in a SAS domain.

```
//Establish transceiver communication pairs (TX to RX)
//Recurse through the SAS domain establishing pairs of coupled transceivers
//Store identified pairs in structures that contain, device type, PHY, SAS address and
            direction of the communication link (which transceiver of the pair is
            RX or TX)
//For each coupled pair identified:
    //For each drive emphasis parameter setting (0 to 7)
        //For each drive strength parameter setting (F to 0)
            //For each slew rise/fall parameter setting (0 to 7)
                //Clear error counters and reset transceiver pair
                //Wait short period of time for an error to increment counter
                //Read error registers of one or both transceivers of the pair
                //If read error count has incremented
                    //Add increment to counter matrix[x][y][z]
                        (x=drive strength setting,
                        y=drive emphasis setting, and
                        z=slew rise/fall setting at which error(s) occurred)
                //else
                    //Add to Matrix Results[x][y][z] that with this setting no errors occurred.
            //Loop again, modifying slew rise/fall parameter setting by incrementing it.
        //Loop again, modifying drive strength parameter setting by decrementing it.
    //Loop again, modifying drive emphasis parameter setting by incrementing it.
    //Store Matrix Result into TX side of structure of communication pair
    //Repeat above steps changing the TX side to RX and the RX side to TX.
    //Select preferred parameter settings based on error counters.
    //Resume normal operation of this identified transceiver pair.
//Loop again, test and tune next identified pair
```

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for tuning setting of transceivers in SAS components in a SAS domain, the method comprising:
    transmitting a predetermined test pattern of data through a transmitting transceiver to a receiving transceiver over a SAS communication path coupling the transmitting and receiving transceivers; and
    tuning operation of a transceiver pair in response to the transmission of the test pattern, the step of tuning comprising:
        reading status registers of the transmitting and the receiving transceivers to determine performance of the transceivers in response to the test pattern; and
        writing control registers of the transmitting and the receiving transceivers to tune operation of the transmitting and the receiving transceivers in response to reading the status registers.

2. The method of claim 1 further comprising:
    altering control register settings of the transmitting transceiver prior to transmitting; and
    repeating the steps of altering and transmitting prior to tuning,
    wherein the step of tuning further comprises:
        tuning operation of a transceiver in response to a predetermined number of transmissions with various control register settings of the transmitting transceiver.

3. The method of claim 1 wherein the step of tuning further comprises:
    tuning the link quality of the SAS communication link responsive to the transmission of the test pattern.

4. The method of claim 1
    wherein the test pattern is a walking bit test pattern, and
    wherein the step of tuning further comprises:
        tuning the drive emphasis of the SAS communication link responsive to the transmission of the test pattern.

5. The method of claim 1
    wherein the test pattern is a periodic clock signal test pattern, and
    wherein the step of tuning further comprises:
        tuning the slew rise/fall parameter of the SAS communication link responsive to the transmission of the test pattern.

6. A method for tuning performance of a coupled pair of transceivers, the pair comprising a transmitting transceiver and a receiving transceiver, the method comprising:
    clearing status registers of at least one of the pair of transceivers;
    setting control registers of the transmitting transceiver to adjust parameters of the transmitting transceiver operation;
    transmitting a predetermined test pattern from the transmitting transceiver to the receiving transceiver;
    reading the status registers of at least one of the pair of transceivers to identify errors from the transmission;
    incrementing an identified counter of a plurality of counters for any identified errors from the transmission wherein the counter is associated with the current settings of the control registers;
    repeating the steps of clearing, setting, transmitting, reading, and incrementing for a plurality of distinct settings of the control registers; and determining a preferred setting of the control registers based on the plurality of counters.

7. The method of claim 6 wherein the step of setting control registers further comprises:
setting one or more register values selected from the group of values consisting of: drive emphasis, drive strength, and slew rise/fall.

8. The method of claim 7 wherein the status registers include a parity error status indicator and a dword sync loss status indicator and wherein the step of reading further comprises:
reading the parity error status indicator and the dword sync loss status indicator to identify errors associated with the transmission.

9. The method of claim 8 wherein the test pattern is a walking bit test pattern and wherein the identified errors relate to drive emphasis.

10. The method of claim 8 wherein the test pattern is a periodic clock pattern and wherein the identified errors relate to slew rise/fall parameter.

11. A system comprising:
a first transceiver having first configuration registers for storing current configuration values to configure operation thereof and having first status registers to identify errors detected by the first transceiver;
a second transceiver communicatively coupled to the first transceiver having second configuration registers for storing current configuration values to configure operation thereof and having second status registers to identify errors detected by the second transceiver; and
a SAS initiator device communicatively coupled to the first transceiver and communicatively coupled to the second transceiver wherein the SAS initiator device further comprises:
a first error table comprising a first plurality of counters associated with the first transceiver;
a second error table comprising a second plurality of counters associated with the second transceiver;
a link tester adapted for configuring the first and second transceivers to transmit a test pattern and adapted for reading the first and second status registers and adapted for counting, in the first error table, errors detected in the read first status registers and adapted for counting, in the second error table, errors detected in the read second status registers; and
a transceiver tuner for tuning settings of the first and second configuration registers based on the first error table and based on the second error table.

12. The system of claim 11 wherein the first transceiver is integral with the SAS initiator device.

13. The system of claim 11 wherein the first transceiver is within a SAS device external to the SAS initiator device.

14. The system of claim 11 wherein the first error table further comprises an N-dimensional array of counters where N is a number of configuration values stored in the first configuration registers and wherein each counter is used by the link tester to accumulate a count of errors detected in the first status registers associated with a corresponding setting of the configuration values in the first configuration registers.

* * * * *